May 3, 1960 O. E. MILLER 2,935,196
REGENERATION SYSTEM FOR LIQUID-TREATING APPARATUS
Filed March 22, 1957 2 Sheets-Sheet 1
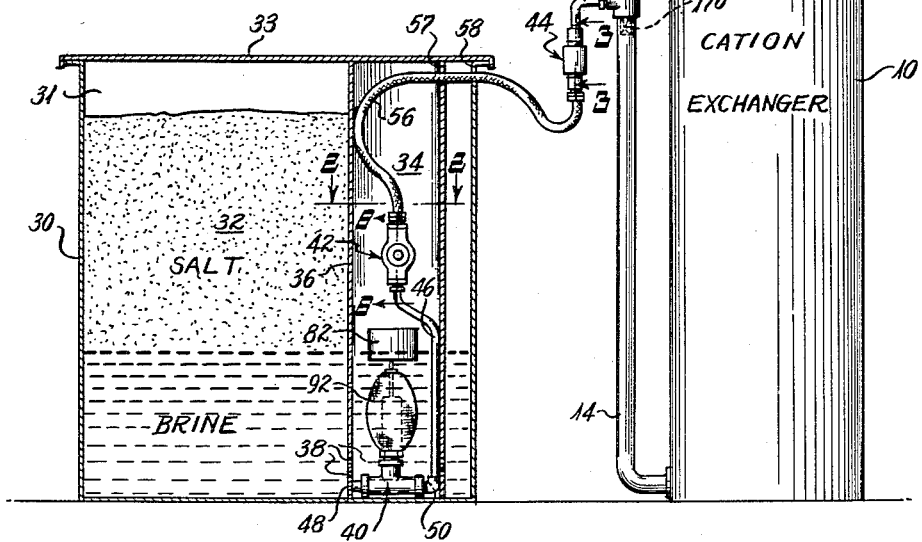
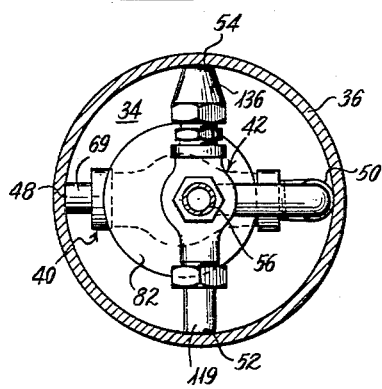
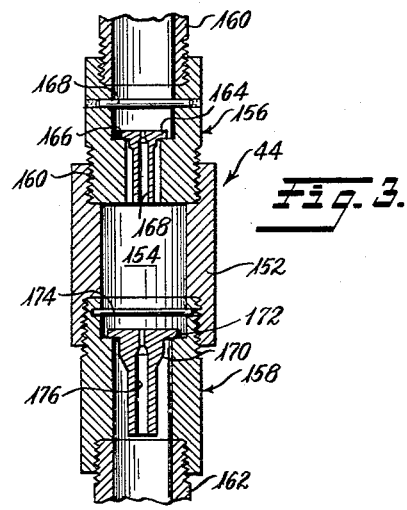
INVENTOR.
Omer E. Miller
BY
Bacon & Thomas
ATTORNEYS

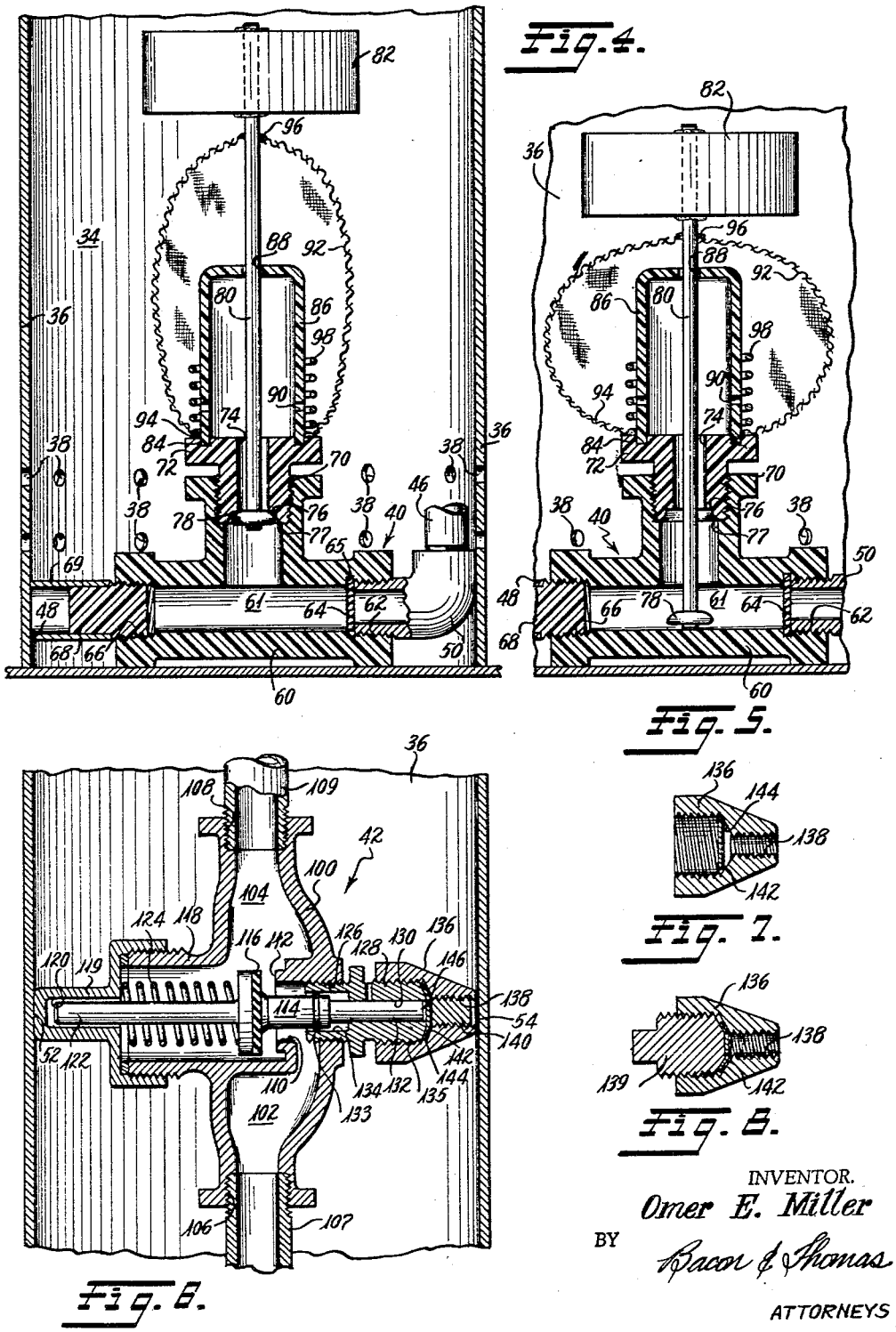

United States Patent Office 2,935,196
Patented May 3, 1960

2,935,196

REGENERATION SYSTEM FOR LIQUID-TREATING APPARATUS

Omer E. Miller, Westfield, N.J., assignor to The Porta Soft Company, Westfield, N.J., a partnership Application March 22, 1957, Serial No. 647,823

18 Claims. (Cl. 210—104)

This invention relates to a regeneration system for liquid-treating apparatus, and more particularly to improvements in apparatus for non-pressurized brine systems utilized in the regeneration of cation exchangers for water softening and the like.

Heretofore, regeneration systems of the type described have not been entirely satisfactory in all respects. For example, the brine valve governing the flow of make-up liquid to the brine tank sometimes fails to completely seal off, thereby causing the regenerant to overflow the brine tank, resulting in loss of regenerant and damage to the surrounding and adjacent property. The piping and valving elements within the brine tank are constantly exposed to extremely corrosive conditions, and rupture thereof causes similar disastrous results. Dirt or other foreign matter introduced into the brine tank with the commercial grade salt commonly supplied for brine formation, or from other sources, may also enter the system and cause valving troubles and other difficulties.

The principal object of the present invention is to provide improved apparatus minimizing the possibilities of malfunctioning of the regenerating system.

Another object of the invention is to provide means for preventing the entry of foreign solid matter into the regenerating system either from the brine tank or from the liquid-treating apparatus supplied by such system.

Another object of the invention is to provide novel filtering means for preventing entrance of foreign matter into the brine valve.

Still another object of the invention is to provide an improved float-controlled, filter-guarded brine valve in which danger of misalignment of the valving element is minimized, and in which the proper seating of such element is insured.

A still further object of the invention is to provide means for pressure aerating the make-up liquid entering the brine system so that contaminants such as iron will be removed or converted to an innocuous form.

A still further object of the invention is to provide means in the regenerating system for minimizing pressure oscillations during the flow of make-up water to the brine tank.

Another object of the invention is to provide safety-valve means for automatically shutting off the flow of make-up liquid into the brine tank in case of failure of the brine valve to seal, or in case of rupture of the piping or valving elements in that portion of the system which is constantly immersed in water or brine in the brine well.

Another object of the invention is to provide a novel safety valve which is actuated by the dissolving action of liquid in which it may be submerged, and which is readily reset for normal operation.

These and other objects and advantages of the invention are accomplished by the apparatus described in detail hereinafter in conjunction with the accompanying drawings, in which:

Fig. 1 is an elevational view (partially in section) illustrating ion-exchange liquid-treating apparatus in combination with the brine-regenerating apparatus of the invention;

Fig. 2 is a sectional view taken on the line 2—2 of Fig. 1 and illustrating the arrangement of apparatus within the well of the brine tank, whereby proper registration of the brine valve within the well is insured;

Fig. 3 is an enlarged sectional view taken on the line 3—3 of Fig. 1, and showing in detail the aerating and pressure-regulating device of the regenerating assembly;

Fig. 4 is an enlarged sectional view illustrating in detail of filter-guarded, float-controlled brine valve utilized in the assembly of Fig. 1, the brine valve in this instance being in the closed position prior to the beginning of a regenerating cycle;

Fig. 5 is a fragmentary sectional view similar to Fig. 4, but showing the brine valve in an open position during or at the end of a regenerating cycle;

Fig. 6 is an enlarged sectional view taken on the line 6—6 of Fig. 1, and showing in detail the construction of the safety valve utilized in the regenerating assembly;

Fig. 7 is a sectional view illustrating one step in the method for resetting the safety valve shown in Fig. 6; and Fig. 8 is a sectional view illustrating a further step in the method of resetting the safety valve of Fig. 6.

Referring now specifically to Fig. 1, there is shown a conventional water-softening tank 10, which may contain a bed of cation exchange material, such as zeolite, synthetic resin beads, or the like. The tank 10 is provided with an inlet conduit 12 for water to be softened, and with an outlet conduit 14 for softened water which has passed though the bed of cation exchange material within the tank 10 and exchanged its hardness components, such as calcium and magnesium ions, for sodium ions—all in well-known manner.

The inlet conduit 12 and outlet conduit 14 are connected to a valving assembly generally designated as 16, which, in the form illustrated is of the type fully described in my Patent No. 2,751,347, issued June 19, 1956. The assembly 16 includes double-acting valve means 17 which controls the direction of flow of liquid through the tank 10 during softening and regenerating cycles, and also includes nozzle 17a and throat means 17b which effect the flow of regenerating liquid into the water-softening apparatus during the latter cycle. The valving assembly 16 is connected to a supply pipe 18 which in turn is connected to a source of liquid under pressure, to a service pipe 20 supplying softened water from the softening apparatus to service, and to a drain 22 through a valve 24 which may be opened and closed periodically by conventional timing mechanism 26. Valving assembly 16 is also connected to a conduit 28 through which regenerating liquid is drawn during the regenerating cycle of the system and through which make-up water is introduced in the reverse direction after the regenerating cycle has been completed.

A brine tank 30 is disposed to one side of the water-softening tank 10. The tank 30 has a primary compartment 31 for storage of a supply of salt 32 which is added in bulk periodically, as required. A loose-fitting, removable cover 33 may be provided if desired, or, alternatively, the top of the tank 30 may be left open. The brine tank 30 is further provided with a well 34 defined by a tile or the like resting on the tank bottom and having a cylindrical wall 36. The wall 36 is provided with a series of ports or openings 38 at the bottom thereof for the free passage of liquid to and from the well 34 and primary compartment 31.

It will be understood that the brine supply apparatus of the present invention may be utilized in any system capable of withdrawing brine through conduit 28 and providing make-up liquid to the regenerating tank 30 by reverse flow through conduit 28, the water-softening tank 10 and valving assembly 16 merely being illustrative of one of the many arrangements accomplishing this function.

The apparatus of the present invention comprises an assembly through which brine is withdrawn from well 34 of the tank 30 and supplied to the conduit 28, and thence to the tank 10 during the regenerating cycle of the system, and make-up liquid is supplied by reverse flow through the same conduit 28 to the well 34 for dissolving more salt to provide the next supply of regenerant. This assembly comprises a float-controlled brine valve 40 positioned in the bottom of the well 34, a safety valve 42 also positioned in the well 34 above the brine valve 40 in a manner to be more exactly described hereinafter, and an aerating and flow-restricting device 44 positioned between safety valve 42 and the valving assembly 16. The brine valve 40 rests on the bottom of the tank 30 within the well 34, and is connected to the safety valve 42 by means of a rigid conduit 46 which supports safety valve 42 centrally of well 34 and above the range of operation of the float element of brine valve 40.

In order to ensure proper positioning of the brine valve 40 within the well 34, the horizontal distance between extremity 48 of the brine valve 40 and the side of elbow 50 connecting this valve to conduit 46 is regulated so that it is substantially equal to the diameter of the well 34. The safety valve 42, as best shown in Fig. 2, is also of a width (between its horizontal extremities 52 and 54) substantially equal to the diameter of the well 34 and is positioned on the conduit 46 so that its horizontal axis is 90° out of phase with the horizontal axis of the brine valve 40. In this manner, when the assembly is placed in the well 34 there can be substantially no lateral shifting of the brine valve 40. The assembly can be positioned in the well only in centered and vertical relationship, thus making it substantially impossible for the wall 36 to interfere with the action of the float element of the brine valve. Accordingly, even if a flexible line is connected between the water softening tank 10 and brine valve assembly within the well 34, proper registration of the brine valve 40 will be maintained. The location of either the softening tank 10 or brine tank 30 can be moderately changed or disturbed without harm. It will be seen that by removing cover 33 from the brine tank 30, the entire assembly within the well 34 may be withdrawn for inspection, repair, or replacement.

The aerating and flow-restricting device 44 at its upper end is connected to the conduit 28 by which it is supported, and is connected at its lower end to safety valve 42 by means of a flexible hose 56 which passes through openings 57 and 58 in the top of wall 36 and tank 30. However, it is to be understood that the aerating and flow-restricting device 44 may be positioned inside of the well 34 or anywhere in the system between brine valve 40 and valve control assembly 16.

Referring now to the filter-guarded, float-controlled brine valve 40 in detail, and with particular reference to Fig. 4, it will be seen that this valve comprises a T-shaped body 60 providing a valve chamber 61 having a threaded opening 62 at one end in which elbow 50 of conduit 46 is engaged. Within the threaded opening 62, there is positioned a filter 64, preferably of finely-woven plastic, such as Saran cloth, or the like. This filter 64 is held in place against a shoulder 65 by the end of elbow 50 and functions to prevent entrance of scale or other foreign matter from the softening system into the valve 40 during the flow of make-up liquid from conduit 46 into the well 34. The other end of valve chamber 61 is provided with a threaded opening 66 closed by plug 68, on which a tubular extension 69 is disposed thereby centering the valve body within the well 34 and the structure with respect to wall 36. Valve chamber 61 is provided with a lateral threaded opening 70 accommodating a valve seat member 72. The seat member 72 is centrally bored at 74, and is counterbored at its lower end to provide a seat 76 and pilot 77 for a valve element 78. It will be noted that the pilot 77 is rounded off to guide the valve element 78 upon its seat 76. Valve element 78 is carried by a rod 80 which is attached to its upper end to a float 82. The valve seat member 72 is concentrically grooved at 84 and a valve guide member 86 is cemented, or otherwise secured within this concentric groove. Valve guide member 86 is centrally bored at its upper end at 88 to provide for passage of valve rod 80. Approximately vertical alignment of the valve rod 80 during reciprocable movement is obtained by the guiding action of the opening 88 at the upper portion of the rod 80 and the bore 74 at the lower portion of the rod 80. The central bore 74 through the valve seat element 72, however, is of substantially larger diameter than the valve rod 80 to permit the free flow of liquid through the bore 74 along the rod 80 when the valve element 78 is unseated as, for example, in the position shown in Fig. 5. The flow of both brine and make-up water is through bore 74. The valve guide member 86 is provided with openings 90 to provide communication between the valve bore 74 and the well 34.

In accordance with one of the important features of this invention, a flexible filter 92 is disposed around the valve guide member 86. This filter 92 is made of plastic woven cloth, such as Dynel, and is cemented at its lower end 94 to the valve guide member 86 and valve seat member 72, and at its upper end 96 to the valve rod 80. Since all of the elements of the valve 40 preferably are of plastic material they are readily cemented together by any suitable plastic cement. The flexible filter 92 must be of sufficient length and of sufficient flexibility to permit travel of the valve rod 80 from the fully closed position of the valve 40 as shown in Fig. 4 to the fully open position of the valve as shown in Fig. 5. This flexing of the filter 92 between open and closed positions aids in keeping the filter surfaces clean during the operation of the system. Further, the attachment of the filter 92 to the rod 96 prevents the float 82 from twisting and turning, and thus contributes to the proper seating of the valve element 78. The rigidity of the plastic filter 92 adjacent its ends may be increased by heat-sealing the edges prior to cementing the filter in place. It will be understood, however, that the filter 92 must retain sufficient flexibility to allow the rod 80 to move freely up and down in response to the float 82. Since it is desirable to take full advantage of the entire filter area of the filter 92 during the flow of brine from the well 34 through the valve 40 into the system, a plastic spring 98 is provided around the valve guide member 86 and between this guide member and the filter 92. This spring prevents the filter 92 from sucking against the openings 90, so that foreign matter will collect over the entire filter area instead of just adjacent the openings 90. In addition to its filtering function during brine withdrawal, the flexible element 92 functions to prevent spray, due to pressure surges on back-filling of the tank with make-up water, from hitting the float 82, and thus causing the brine valve to seal prematurely. Make-up liquid passing outward through the openings 90 contacts filter element 92 and enters the well 34 in a controlled manner.

From Fig. 1 it can readily be seen that any rupture in the lower parts of conduit 46 or of the brine valve 40 or any failure of the valve 40 to seal will cause brine tank flooding and loss of regenerant. To prevent such losses or damages, safety valve 42 is positioned in the well 34 above the drain valve 40 and just clear of the position of the float 82 in its uppermost position. The structure of the safety valve 42 is shown in detail in Fig. 6, and comprises a valve body 100 having an inlet chamber 102 and an outlet chamber 104. Chamber 102 has a threaded inlet opening 106 accommodating a conventional fitting 107 for connection to the end of conduit 46, and outlet chamber 104 likewise has a threaded opening 108 accommodating a conventional fitting 109 for connection to the end of conduit 56. An opening 110 provides communication between the chambers 102 and 104, and a valve seat 112 is formed in the valve body 100 concentric with such opening. Valve stem 114 passes through opening 110 and carries valve closure member 116, which is adapted to engage seat 112 in the closed position of the valve and thereby shut off the flow of liquid between the chambers 102 and 104. A threaded lateral boss 118 is provided on one side of valve body 100 and accommodates a cap member 119. The cap member 119 has a central cylindrical chamber 120 providing a guide for reduced upper portion 122 of the valve stem 114. Spring 124 concentric with the portion 122 normally urges the valve closure member 116 toward a closed position upon its seat 112. Diametrically opposite the boss 118, the valve body 100 is provided with a threaded opening 126 accommodating a further valve stem guiding member 128. The member 128 is centrally bored at 130 and receives reduced lower portion 132 of the valve stem 114. An O-ring 133 in a counterbore 134 in member 128 prevents leakage around the valve stem 114. The valve guide member 128 is threaded at its outer end at 135, and is provided with a screw cap 136. The cap 136 has a central threaded opening 138 slightly larger than the diameter of the reduced portion 132 of the valve stem 114, and is provided with a water-soluble plug 140 which maintains the valve closure element in the cocked or open position against the pressure of spring 124, as shown in Fig. 6. In accordance with the invention, the plug 140 is of a non-hygroscopic material which is readily dissolvable in water or liquid regenerant solution. Fused ammonium alum has been found to be an excellent material for this purpose. Other substances, such as sugar and the like, in the highly humid atmosphere within the well 34 of the regenerating tank, have been found too hygroscopic to be used, or possess other characteristics rendering them undesirable. The interior of cap 136 below the plug 140 is provided with a fragile but liquid-impermeable membrane 142, such as glazed blotter paper or the like, which is held in position between valve guide member 128 and shoulder 144 of the cap 136. The end 146 of the reduced portion 132 of the valve stem 114 bears upon the membrane 142 and is to some extent cushioned thereon against the pressure of spring 124.

The fused ammonium alum plug 140 is cast in the threaded portion 138 of the cap 136 and is held in place by the threads. For example, membrane 142 is made from blotter paper which has a glazed, water-resistant paper glued to one side. The size of the membrane 142 is such that it will fit upon the shoulder 144 of the cap 136. The membrane 142 is then inserted in the cap 136 with the glazed side against the shoulder 144, as shown in Fig. 7, whereby the glazed side eventually forms the bottom of the mold defined by threaded opening 138. A male plug or blank 139 is then screwed into the cap 136 in the manner shown in Fig. 8 to thereby complete the mold cavity and draw the membrane 142 taut, thus making it possible to fill the cavity 138 with powdered ammonium alum. After the cavity is filled, the cap 136 is heated to a point at which incipient fusion of the powdered alum occurs, and the alum is then transformed into a liquid. The cap 136 is then allowed to cool, whereby the alum solidifies and a permanent plug is obtained which is not hygroscopic, yet is water-soluble. Since the liquid alum seeks out the threads in the cap 136, the plug 140 will not be pushed out prematurely by the pressure of the valve stem end 146 when the valve member is cocked to the open position. The glazing of the side of the membrane 142 next to the side of the plug 140 prevents the liquid alum during the casting stage from penetrating the membrane and destroying its cushioning effect. It will be understood that other means such as a pin or the like, might be used in place of threads to prevent continued pressure of the valve stem 114 from shearing the alum plug from the end of the cap 136.

To cock the safety valve 42 to its open position shown in Fig. 6, before the assembly is inserted in well 34 cap 119 is unscrewed permitting the spring 124 and valve stem assembly to be retarded to the left, as viewed in Fig. 6, so that the end 146 does not extend completely through the opening 130. The cap 136 with fused alum plug 140 in place is then screwed on to the guide member 128, and cap member 119 is again screwed into place. Spring member 124 will then again exert pressure upon the valve closure member 116, which will be held off its seat by lower stem portion 132 bearing against plug 140. This condition will exist until the fused alum plug 140 is either ruptured or dissolved by the action of dissolving liquid in which the valve 42 may become submerged. At this time the spring 124, which is normally urging the closure member 116 to the closed position, will cause the valve closure member 116 to seat on seat 112, with the lower stem portion 132 entering opening 138, whereupon both spring pressure and normal operating pressure of the system will hold the valve closed and prevent any further liquid from entering the brine tank via conduit 56. The valve 42 may be readily recocked by withdrawing the assembly from the well 34, and after any necessary repairs have been made, remolding another alum plug in the cap 136, or simply substituting another cap with a pre-formed plug in place.

The structure of the aerating and fluid-flow-regulating device 44 is shown in Fig. 3. This device 44 comprises a short section of conduit 152 providing an enlarged chamber 154 between two flow-restrictor valves 156 and 158. The upper flow-restrictor valve 156 is connected by conventional fitting 160 to conduit 28 (Fig. 1) leading to the valving assembly 16 of conditioning tank 10. The lower flow-restrictor valve 158 is connected by conventional fitting 162 to conduit 56 (Fig. 1) through which connection is made to safety valve 42. Restrictor valve 156 has a movable restrictor valve element 164 which in a lower position is adapted to seat upon a shoulder 166 and in a raised position engages a pin 168. The restrictor valve element 164 is provided with a central port 168 through which liquid may flow downwardly in the seated position of the valve as shown in Fig. 3. In the raised position of element 164 liquid may flow freely around its edges. The restrictor valve 158 is similarly constructed and has a restrictor valve element 170 which is adapted to move between a shoulder 172 and pin 174. The restrictor valve element 170 has a central port 176 through which liquid may flow when the valve is seated in the position shown. These valve elements 156 and 158 provide one-way flow restrictors connected in series whereby the flow of make-up water from the valve assembly 16 is restricted to flow through ports 168 and 176 in its passage to the regenerating tank, but flow of brine in the opposite direction during the regenerating period is practically unrestricted due to the raising of the valve elements 164 and 170 off their respective seats. After completion of brine injection from the regenerant tank 30 into the water softener 10, the chamber 154 between the two flow restrictor valves 156, 158 is devoid of liquid providing an air chamber. Hence, when make-up water is introduced into the regenerating tank 30, it is pressure-aerated during its flow through chamber 154 and contaminants such as iron are converted to a form which will not discolor the brine solution.

Another function of the restrictor valves 156, 158 is to meter the flow of liquid into the brine valve 40 during the flow of make-up water. At the completion of the regeneration cycle in a countercurrent water softener of the type described, the reversal from a negative pressure, or vacuum, to a positive pressure for refilling is not always steady. Quite frequently there are violent pressure oscillations which will cause a single restrictor valve to unseat. However, with the air chamber 154 between the pair of restrictor valves 156, 158, as shown, it is not possible to unseat both valves at the same time. Thus, any surges in pressure, which might cause premature sealing or closing in the brine valve 40, are modulated before entering this member.

In accordance with a further feature of the invention, the minimum diameter of the ports 168 and 176 in the restrictor valve elements 164 and 170 is substantially less than the diameter of the nozzle 17a in the valving arrangement 16. For example, the nozzle diameter of nozzle 17a may be 0.089 inch while the minimum diameter of the ports 168 and 176 may be 0.040 inch—less than one-half the nozzle diameter. As will be more fully explained hereinafter, this provides a means for permitting the system to quickly approach pressure equilibrium conditions upon the closing of drain valve 24 so that double-acting valve means 17 can return the system to the service cycle.

In the operation of the system illustrated in Fig. 1, the brine valve 40 will normally be closed during the service run both by the float 82 and by the system pressure acting on the under side of valve element 78 (Fig. 4). Water to be softened enters the supply line 18, passing through inlet 12 into the top of the water-conditioning tank 10, the double-acting valve means 17 being in its downward position. Softened water will be withdrawn through line 14 and line 20 to service, upon demand. To initiate the regenerating cycle, after the cation exchange bed in tank 10 has been at least partially exhausted, drain valve 24 will be opened by the operation of timer 26, whereupon the double-acting valve means 17 will be automatically raised to cause flow of water downward from supply line 18 through assembly 16 in reverse flow from the service run, nozzle 17a and throat means 17b creating low pressure area, thereby causing brine to be drawn from the line 28 into the line 14 and upward through the exchanger 10 and out of drain 22. The valve element 78 of float valve 40 is unseated by the negative pressure or vacuum condition and brine is drawn into the float valve 40 from the well 34 through the flexible filter 92, and as the liquid level drops in the tank 30 the float valve 40 will assume its fully open position, as shown in Fig. 5. During this operation, substantially all dirt and other foreign matter which may collect in the well 34 of the brine tank 30 is prevented, by means of the external filter 92, from entering the assembly. Brine passes through the float valve 40 and through conduit 46, safety valve 42, into the flow restrictor means 44, lifting the restrictor elements 164 and 170 from their seats, and passing substantially without restriction into conduit 28, and thus into the stream flowing in downward direction through conduit 14 into the water-softening tank 10. The brine regenerates the ion exchange material in tank 10 and then passes outward through line 12 and drain valve 24 to drain 22. The brine continues to flow from the brine tank 30 until the liquid therein is exhausted. At this point only air will be taken in through the float valve 40 and series assembly. The flow of liquid from supply line 18 will continue to flow in reverse direction through the water softener 10 until the end of a predetermined time set by the timing mechanism 26 controlling valve 24 on the drain 22. Upon closing of the drain valve 24 at the end of the set time period, the regenerating brine will have been rinsed from the tank 10. The system pressure must now be equalized before double-acting valve means 17 of the valving arrangement 16 will return the system to the service cycle. This is rapidly approached by reason of the restricting and aeration device 44 between valving arrangement 16 and float valve 40 so that it is not necessary for the float valve 40 to close in order for valve means 17 to return by gravity to its downward position. Thus, the resistance offered by the restricted ports 168 and 176 of the device 44 is great enough to permit a quick approach to a sufficiently equalized pressure condition that double-acting valve means 17 will return by its own weight to its downward position. Because of the weight of the valving means 17, it is not necessary to have exact equalization of pressure on both sides of the double-acting valve before it will return to service position. Hence, the pressure existing at the bottom side of valve means 17 equalizes sufficiently through the nozzle 17a and throat 17b to the top side of valve means 17 and the valve means 17 shifts substantially immediately to the down position, rather than waiting until the brine valve 40 shuts off as would normally be the case without device 44.

Water to be softened will now flow from line 18 through inlet 12 and through tank 10. Make-up liquid will flow into the regenerating tank from line 14 through conduit 28 and through the aerating and restricting device 44, safety valve 42, and float-controlled brine valve 40. During the make-up period, the make-up liquid will be aerated in device 44 in the aforedescribed manner, and flow through the assembly and into the tank 10 will be smoothed out by means of the flow-restricting elements 164 and 170. The filter element 64 (Fig. 4) at the line entrance to the float-controlled brine valve 40, prevents particles of scale, or other material, from the water softener and pipes of the system from entering into the float valve 40 to thereby disturb the seating action of the closure member 78 upon its seat 76. Make-up liquid passing through the float valve 40 through bore 74 and openings 90 and into the well 34 is prevented from splashing by means of external flexible filter 92 from which foreign matter on the well side is now cleaned due to the passage of the make-up liquid and also to the flexing action of the filter 92 as the float 82 rises upon the liquid level. With the use of the filter-guarded brine valve of the invention, it has been found that it is no longer necessary to have gravel in the brine tank, all of the functions of the gravel being accomplished by the filter. Upon reaching the desired liquid level in the tank, the float element 82 causes the valve-closure element 78 to seat, whereby a supply of salt 32 is dissolved within the liquid in tank 30 to provide brine for the next regenerating cycle. Should the float valve fail to operate properly, or in the event of rupture of any of the parts in the lower part of well 34, when submerged, safety valve 42 will function to close off the flow of water into the well 34 and prevent damage.

It will be seen that an improved and completely safe regenerating system has been provided for liquid treating apparatus to be used for either household or industrial purposes. While the invention has been specifically described with respect to water-softening apparatus, it will be understood that the assembly as well as the various components thereof may be advantageously employed in many other liquid-flow systems.

I claim:

1. In a liquid-treating system utilizing a non-pressurized regenerant tank having a float valve controlled conduit through which regenerant solution is withdrawn from said tank upon demand by said treating system during a regeneration cycle and through which make-up liquid is introduced into said tank upon completion of the regeneration cycle, the combination of apparatus safeguarding against malfunctioning of the system comprising: filter means positioned at the inlet and outlet of said float valve to prevent the entrance of foreign matter into said valve; a safety valve in said conduit positioned in said regenerant tank at a level above the normal liquid level in said tank as determined by said float valve, said safety valve having an element responsive to the dissolving action of liquid in said regenerant tank to actuate said valve and thereby prevent further flow of liquid through said conduit; and a means in said conduit for pressure-aerating and modulating the flow of make-up liquid passing therethrough.

2. In a liquid-treating system utilizing a non-pressurized regenerant tank having a float valve controlled conduit through which regenerant solution is withdrawn from said tank upon demand by said treating system during a regeneration cycle and through which make-up liquid is introduced into said tank upon completion of the regeneration cycle, the combination of apparatus safeguarding against malfunctioning of the system comprising: filter means positioned at the inlet and outlet of said float valve to prevent the entrance of foreign matter into said valve; and a safety valve in said conduit positioned in said regenerant tank at a level above the normal liquid level in said tank as determined by said float valve, said safety valve having an element responsive to the dissolving action of liquid in said regenerant tank to actuate said valve and thereby prevent further flow of said liquid through said conduit.

3. In a liquid-treating system utilizing a non-pressurized regenerant tank having a float valve controlled conduit through which regenerant solution is withdrawn from the tank upon demand by said treating system during a regeneration cycle and through which make-up liquid is introduced into said tank under completion of regeneration cycle, apparatus safeguarding against malfunctioning of the system comprising: filter means positioned at the inlet and outlet of said float valve to prevent the entrance of foreign matter into said valve, said filter means including a flexible filter attached to a movable element of said float valve and adapted to be flexed thereby.

4. The structure as defined in claim 3 wherein said float valve includes a reciprocably-movable valve rod extending through a vertical bore providing for the flow of liquid through said valve, and wherein said flexible filter is connected at one end to said rod and at the other end to a stationary element of the float valve assembly.

5. In a liquid-treating system untilizing a non-pressurized regenerant tank having a float valve controlled conduit through which regenerant solution is withdrawn from said tank upon demand by said treating system during a regeneration cycle and through which make-up liquid is introduced to said tank upon completion of the regeneration cycle, the combination of apparatus comprising: filter means positioned at the inlet and outlet of said float valve to prevent the entrance of foreign matter into said valve; and the means in said conduit for pressure-aerating and modulating the flow of make-up liquid passing therethrough whereby said float valve is protected against excessive pressure oscillations.

6. In combination: a tank for providing a supply of liquid; a cylindrical wall defining a well within said tank; means providing communication between said tank and well for the flow of liquid therebetween; a float valve positioned adjacent to the bottom of said well, said float valve having upwardly extending means connected to a float element; a rigid conduit connected to said float valve and extending upwardly within said well to one side of said float element, the maximum horizontal dimension of said float valve and conduit assembly being substantially equal to the diameter of said well; and a safety valve connected to said rigid conduit and supported thereby in said well above the operating range of said float valve, the maximum horizontal dimension of said safety valve being substantially equal to the diameter of said well, and said maximum horizontal dimensions of said float valve assembly and safety valve being at approximately right angles to each other whereby said valve assembly is maintained in vertical alignment within said well.

7. In a float valve having a valve rod extending through a vertical bore and carrying a valve closure element at its lower end and a float element at its upper end, said closure element controlling the flow of liquid through said vertical bore in response to the position of said float element, a flexible filter surrounding a portion of said rod, one end of said flexible filter being secured to said valve rod and the other end of said flexible filter being secured to a stationary portion of said float valve so that liquid passing through said vertical bore along said valve stem passes through said flexible filter.

8. A filter-guarded float valve for controlling the withdrawal of solution from a dissolving tank and the reverse flow of make-up liquid into said tank, comprising: a valve body adapted to rest on the bottom of said tank, said valve body having a first port adapted to be connected to a delivery conduit and a second port for establishing communication with said tank; a centrally-bored valve seat member in said second port; a valve rod extending through the central bore of said seat member, sufficient clearance being provided between said rod and bore to permit the free flow of liquid; a valve-closure-element carried by the lower end of said rod and adapted to co-operate with said seat member to close said bore when said rod is in an upper position; a float mounted on the upper end of said rod; a guide member mounted on said seat member and concentric with said rod to maintain vertical alignment thereof; and a flexible filter enclosing said guide member and attached at its upper extremity to said valve rod and at its lower extremity to said valve seat member.

9. A filter-guarded float valve, comprising: a valve body having an inlet port and an outlet port communicating with a valve chamber, at least one of said ports being directed upwardly with respect to the valve body; a centrally-bored seat member in said upwardly directed port, a lower portion of said seat member providing a valve seat concentric with said central bore; a valve rod extending through the central bore of said seat member with sufficient clearance being provided between said rod and bore to permit the free flow of liquid therebetween; a valve-closure-member carried by the lower end of said rod and adapted to cooperate with said valve seat to close said bore when said rod is in an upper position; a float mounted on the upper end of said rod; an upwardly-extending guide member mounted on said seat member and maintaining said rod in vertical alignment, said guide member having lateral openings for the passage of liquid; and a flexible filter enclosing said guide member and attached at its upper extremity to said valve rod and at its lower extremity to said valve seat member.

10. The float valve structure of claim 9 in which means are provided for maintaining said flexible filter in outwardly spaced relation with respect to the lateral openings in said guide member.

11. The float valve structure of claim 9 wherein all of the elements are of plastic material and said flexible filter is adhesively bonded to the valve structure.

12. The float valve structure of claim 9 wherein a filter element is provided for the other of said ports whereby both the inlet and outlet to said valve body are filter-guarded.

13. The float valve structure of claim 9 wherein said valve seat member is provided with a rounded counter bore concentric with said valve seat for guiding said valve closure member into seating relation.

14. In a liquid-treating system utilizing a non-pressurized regenerant tank having a float valve controlled conduit through which regenerant solution is withdrawn from said tank upon demand by said treating system during a regeneration cycle and through which make-up liquid is introduced into said tank upon completion of the regeneration cycle, the combination, comprising: a safety valve in said conduit positioned in said regenerant tank at a level above the normal liquid level in said tank as determined by said float valve, said safety valve having a spring-loaded valve stem and a removable cap having a cavity filled with a solid ammonium alum plug, said valve stem having a portion bearing upon said ammonium alum plug so that said valve is maintained in an open position against spring pressure, the cavity in said cap being accessible to the ambient conditions surrounding said valve whereby said ammonium alum plug may be dissolved upon the submergence of said safety valve in liquid within said tank thereby permitting said valve to close.

15. A safety valve comprising a valve body having an inlet and an outlet and a valve closure member controlling the flow of fluid therebetween, spring means urging said valve closure member to a closed position, a valve stem extending from said valve closure member through said valve body, a cap member removably mounted on said valve body and having a cavity for receiving an end of said valve stem, said cavity being filled with a solid ammonium alum plug, the end of said valve stem bearing upon said plug and thereby maintaining the valve closure member in an open position against spring pressure, the cavity in said cap being accessible to ambient conditions surrounding said valve whereby said ammonium alum plug may be dissolved upon submergence of said valve in liquid.

16. The safety valve of claim 15 wherein said cavity in said cap is a threaded bore and said ammonium alum plug is cast therein so that the threads of said cap retain the plug in place.

17. The safety valve of claim 15 wherein liquid-impervious cushioning means are provided between said ammonium alum plug and the end of said valve stem.

18. The safety valve of claim 15 wherein sealing means are provided around said valve stem to prevent leakage of liquid from the interior of said valve into said cap member.

References Cited in the file of this patent

UNITED STATES PATENTS

| | | |
|---|---|---|
| 1,371,110 | Pelphrey | Mar. 8, 1921 |
| 1,853,859 | Hall et al. | Apr. 12, 1932 |
| 2,333,618 | Strauss | Nov. 2, 1943 |
| 2,347,202 | Lindsay | Apr. 25, 1944 |
| 2,347,204 | Lindsay | Apr. 25, 1944 |
| 2,352,630 | Griswold | July 4, 1944 |
| 2,504,816 | De Ville | Apr. 18, 1950 |
| 2,524,635 | Pick | Oct. 3, 1950 |
| 2,751,347 | Miller | June 19, 1956 |
| 2,798,503 | Carver et al. | July 9, 1957 |